US005539968A

United States Patent [19]

Meyer, Jr.

[11] Patent Number: 5,539,968

[45] Date of Patent: Jul. 30, 1996

[54] PART HOLDING PRESS TOOL WITH NON-MAGNETIC PART HOLDING MECHANISM

[75] Inventor: Herbert J. Meyer, Jr., Rockford, Ill.

[73] Assignee: Western Atlas, Inc., Hebron, Ky.

[21] Appl. No.: 335,497

[22] Filed: Nov. 7, 1994

[51] Int. Cl.[6] .......... B23Q 3/14

[52] U.S. Cl. .......... 29/251; 29/280; 29/282; 269/48.1; 279/906; 279/23.1; 279/2.22

[58] Field of Search .......... 269/48.1; 279/2.22, 279/2.01, 23.1, 906; 29/280, 263, 282, 251, 252; 81/177.85

[56] References Cited

U.S. PATENT DOCUMENTS

| | | | |
|---|---|---|---|
| 2,365,980 | 12/1944 | Thomas | 279/2.22 |
| 2,513,412 | 7/1950 | Holsing | 279/2.22 |
| 2,704,681 | 3/1955 | Fischer | 279/906 |
| 2,806,706 | 9/1957 | Fitch | 279/23.1 |
| 3,792,856 | 2/1974 | Hernandez | 269/48.1 |

*Primary Examiner*—Robert C. Watson
*Attorney, Agent, or Firm*—Barnes, Kisselle, Raisch, Choate, Whittemore & Hulbert

[57] ABSTRACT

A workpiece holding press tool with an elongated body having an annular collar extending from an end face and a plug member secured to the collar by a fastener. The plug forms an annular groove with the body that receives a retainer clip which frictionally engages the inside surface of a workpiece to retain the workpiece on the press tool. The retainer clip is a circular spring steel wire having opposed ends with a relieved portion formed on the outside surface thereof to prevent scratching, marring or otherwise damaging the inside surface of the workpiece. In another embodiment, a second plug is added to provide a second annular groove to receive a second retainer clip for holding elongated workpieces having a cylindrical inside diameter.

15 Claims, 2 Drawing Sheets

PART HOLDING PRESS TOOL WITH NON-MAGNETIC PART HOLDING MECHANISM

FIELD OF THE INVENTION

This invention relates to workpiece holders and more particularly to a non-magnetic holder for a hollow workpiece on the inside diameter thereof.

BACKGROUND OF THE INVENTION

Various forms of workholders have been in use for holding hollow workpieces. For example, permanent magnets embedded in a press tool as well as electromagnets within a press tool have been used to hold metallic workpieces. However, the use of magnets inherently attracts metal chips, metal shavings and other fine metal particles to the press tool. This affects the press tool's ability to properly and accurately locate and press a workpiece. This can also adversely affect the ability of the press tool to properly hold a workpiece to press it into position. Other types of workpiece holders include spring loaded fingers built into the nose of the press tool. The main drawback to this type of workpiece holder is that it limits the size of the workpiece to be held because space is needed for the spring fingers, springs, pivots and other various pieces of assembly. Split collet type tools have also been used to hold a hollow workpiece being pressed to prevent it from falling off the end of the tool. The main disadvantage to the split collet type of tool is that it is fragile because the inside diameter of the collet has to be thin enough to flex and yet be made of hardened steel for wear.

SUMMARY OF THE INVENTION

A workpiece holder press tool is provided for holding a hollow workpiece having either a tapered or straight inside diameter. The workpiece holder comprises an elongated pressing tool which has a separable nose portion or plug that carries a circular retainer clip for frictionally retaining the inside of the workpiece. The separable plug provides easy assembly without permanent distortion of the retainer clip. Additionally, the clip comprises a resilient split circular spring wire having opposed ends. The ends have a flattened outer surface to eliminate sharp corners and edges to prevent damaging the inside surface of the workpiece and facilitate compression of the clip. In another embodiment, a spacer plug is added to increase the length of the entry nose for an additional clip to hold an elongated workpiece.

Objects, features and advantages of this invention are to provide a workpiece holding press tool that can hold a workpiece in position without the use of magnets, can hold workpieces of varying composition, allows for variations in tolerance of the location that the part is being pressed into, allows the retainer clip to be installed or changed without distortion or stretching, is simple, stable, rugged, durable, reliable, quick and easy to use and assemble and of relatively simple design and economical manufacture.

BRIEF DESCRIPTION OF THE DRAWINGS

These and other objects, features and advantages of this invention will be apparent from the following detailed description, appended claims and accompanying drawings in which:

DETAILED DESCRIPTION

Figure 1:
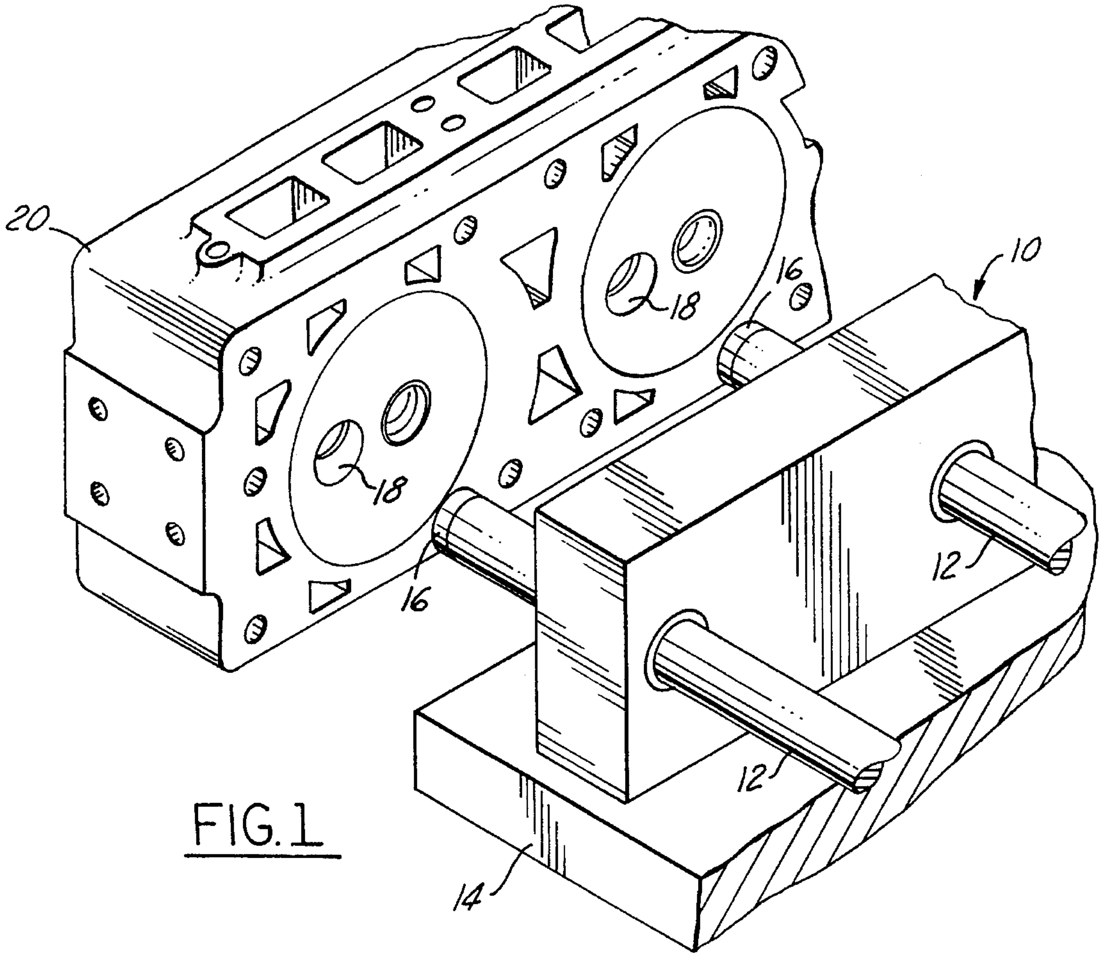
FIG. 1 is a perspective view of a workpiece holding press tool and an engine cylinder head.

Referring in more detail to the drawings, FIG. 1 illustrates a press 10 with a plurality of press tools 12 reciprocally mounted in a base support 14. Each press tool 12 holds a hollow workpiece 16, such as a valve seat, cup plug or bushing. The press tools 12 are reciprocated by a drive (not shown) to press with an interference fit each workpiece 16 into a bore 18 of a body 20 such as a cylinder head for an internal combustion engine.

Figure 2:
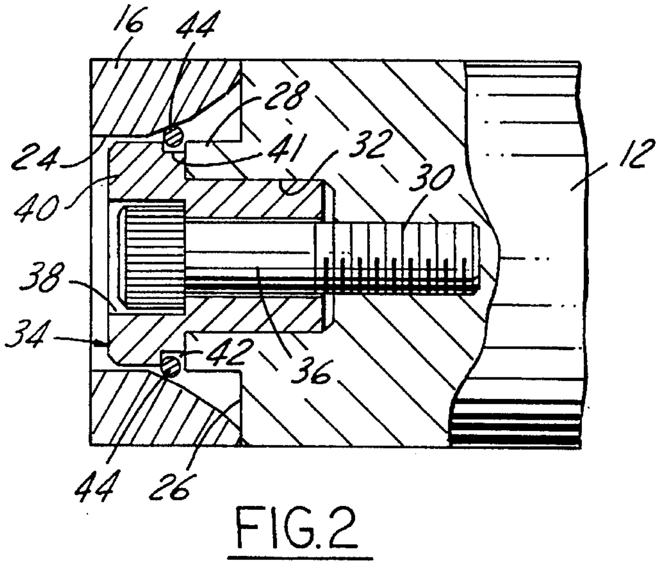
FIG. 2 is an enlarged sectional view of the press tool for holding a workpiece with an inclined internal diameter.

The press tool 12 (FIG. 2) is designed to hold a workpiece having a tapered or frusto-conical inside surface 24. The press tool 12 has an elongated body made preferably from hardened steel with an end face 26 from which a collar 28 axially extends. The body of the press tool has a threaded bore 30 with a counterbore 32 that receives an annular plug 34. The plug is secured to the press tool by a threaded fastener or cap screw 36 extending through a counterbored opening 38 in the plug and threaded into the bore 30 in the press tool. The plug has a head portion 40 with a necked-down shoulder 41 which abuts the collar 28 to form an annular groove 42.

Figure 3:
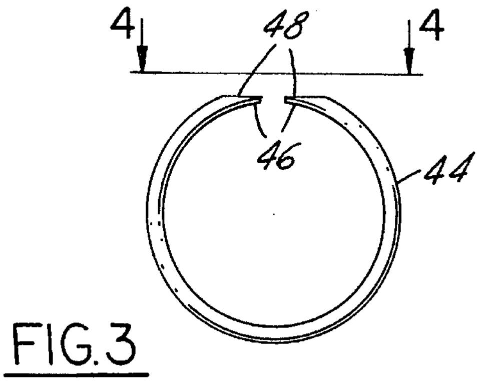
FIG. 3 is an enlarged end view of the circular clip.
Figure 4:
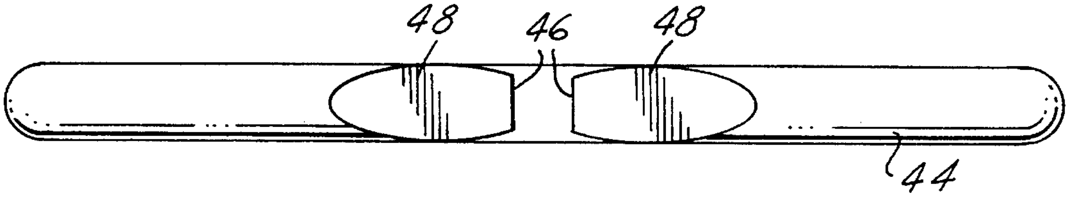
FIG. 4 is an enlarged side view of the opposed ends of the clip.

A retainer clip 44 is received in the groove 42. The clip 44 comprises a resilient metal split ring (FIG. 3) with opposed ends 46 and preferably is made from wire such as spring steel wire or tempered music wire. The outer surface of the opposed ends 46 are ground or otherwise relieved preferably by flats 48 to decrease their thickness and eliminate sharp corners. This prevents the inside surface 24 of the workpiece 22 from being scraped, scratched or otherwise marred by the clip 44 and permits the ring to be smoothly compressed radially inwardly to frictionally retain the workpiece. In its unstressed state, the maximum outside diameter of the clip 44 is greater than the diameter of the surface 24 of the workpiece 16 which it engages.

Once the clip 44 is installed on the tool 12, the workpiece 16 is slipped over the plug 34 so that it engages the end face 26. The clip 44 engages the inside surface 24 of the workpiece 16 which tapers inwardly away from the axis of the press tool 12. The frictional forces between the workpiece 16 and the clip 44 increase as the workpiece 16 is advanced onto the press tool 12 (due to radially inward compression of the clip) so that the workpiece 16 is frictionally held onto the press tool 12 by the clip 44. To permit the clip 44 to be radially compressed, the shoulder 41 has a sufficiently smaller diameter than the inside diameter of the clip in its free or uncompressed state.

Figure 5:
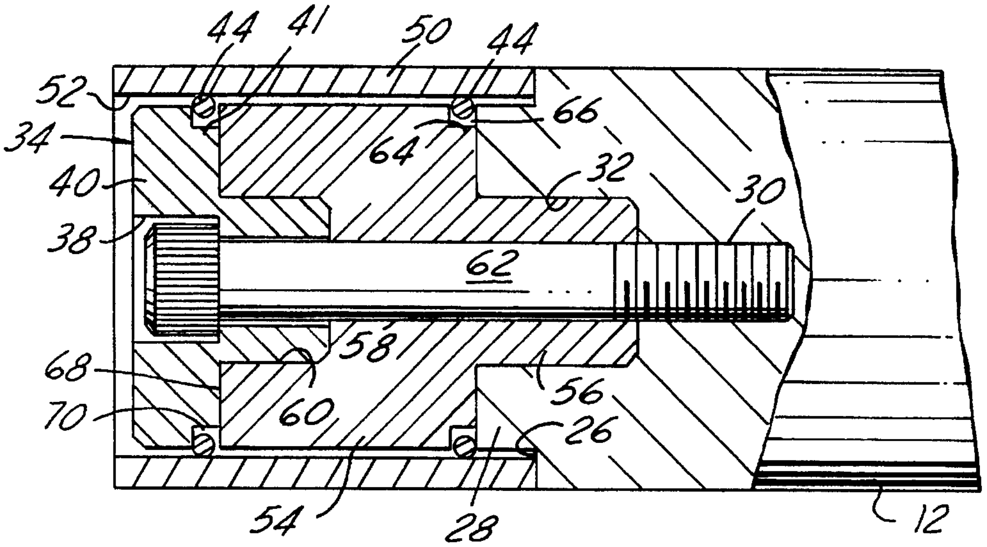
FIG. 5 is an enlarged sectional view of a modified press tool for holding a straight internal diameter workpiece.

FIG. 5 illustrates another embodiment for holding a workpiece 50, such as an elongated bushing, having a straight cylindrical inside surface 52. To increase the length of the press tool and thus its ability to hold the workpiece 50, a spacer plug 54 is provided between the press tool 12 and the plug 34. The spacer plug 54 has an annular portion 56 that is received in the counterbore 32 in the press tool 12. The spacer plug 54 extends outside of the counterbore 32 and has a through opening 58 with a counterbore 60. The plug 34 is received in the counterbore 60 and both the plug 34 and spacer plug 54 are secured to the press tool by a threaded fastener or cap screw 62 received in and extending through the openings 38 and 58 in the plugs, and threaded into the opening 30 in the press tool.

The spacer plug 54 has a necked-down shoulder 64 that abuts the collar 28 of the press tool to form a groove 66 in which a clip 44 is received. The plug 34 is received in the counterbore 60 of the spacer plug 54 and bears on its end face 68 so that the necked-down shoulder 41 forms a second groove 70 that receives a second clip 44.

When the clips 44 are received in the first and second grooves 66 and 70, the workpiece 50 is inserted over the end of the press tool 12 to abut the end face 26 and so that the clips 44 are compressed radially inward and frictionally engage the inside surface 52 of the workpiece 50. The frictional forces between the surface 52 and the clips 44 are great enough to securely retain the workpiece 50 on the press tool 12.

The removable feature of the plugs 34 and 54 allow the clips 44 to be installed without stretching, bending or permanent deformation because the necked-down shoulders 41 and 64 have a smaller inside diameter than the clips 44 in their free or uncompressed state. The clips 44 are simply inserted over the necked-down shoulders 41 and 64 of the plugs 34 and 54 and then the plugs are assembled on and secured to the tools 12 by the cap screws 36 or 62.

In use, the workpiece 16 or 50 is inserted onto the end of the press tool 12 so that the clips 44 are compressed radially inward and frictionally grip the inside surface 24 or 52 thereof. The press tools 12 are then reciprocated by the drive mechanism of the press 10 so that the workpiece 16 or 50 is pressed into the bore 18 of the body 20. As the press tool 12 is withdrawn, the frictional forces between the bore 18 and the workpiece 16 or 50 are sufficiently greater than the friction forces between the workpiece 16 & 50 and the clips 44 so that the clips 44 become disengaged or released from the workpiece 16 or 50.

I claim:

1. A workpiece holding press tool for pressing a workpiece into a bore of a body, comprising:

a press member having an end face, a plug having a body with an annular side wall, an end wall and a circumferentially continuous shoulder opening radially outwardly of said side wall and extending axially away from said end wall to define in cooperation with said end face of said press member a groove for receiving a clip, a fastener releasably securing said plug on said press member, and a split circular retainer clip of a resilient metal having opposed ends with a relieved outer surface thereon and received in said groove to frictionally hold and retain a workpiece on said press member.

2. A workpiece holding press tool for pressing a workpiece into a bore of a body, comprising:

an elongated press member having an end face, a first plug having a body with an annular side wall, an end wall and a circumferentially continuous shoulder opening radially outwardly of said side wall and extending axially away from said end wall to define in cooperation with said end face of said press member a first groove for receiving a clip, a second plug having a body with an annular side wall, an end wall and a circumferentially continuous shoulder opening radially outwardly of said side wall and axially outwardly of said end wall to define in cooperation with said first plug a second groove for receiving a clip, a fastener releasably securing said first and second plugs on said press member, and first and second split circular retainer clips of a resilient metal having opposed ends with a relieved outer surface thereon and received in said first and second grooves to frictionally hold and retain a workpiece on said press member.

3. A workpiece holding press tool for pressing a workpiece into a bore of a body, comprising:

an elongate press member having an end face and an annular collar extending from said end face, said press member having a central threaded opening and a counterbore through said collar, a plug having an annular body located within said counterbore and secured to said press member, said plug having a head portion extending outside of said counterbore and forming a groove with said collar, and a split circular retainer clip having opposed ends with a relieved outer surface thereon located in said groove to frictionally hold and retain a workpiece.

4. The press tool of claim 3 wherein the head of said plug has a stepped down neck that abuts said collar to form said groove.

5. The press tool of claim 3 wherein said plug has a through opening and a counterbore, and a threaded fastener extending through the opening and threaded into the opening in said press member to secure said plug to said press member.

6. The press tool of claim 3 wherein said workpiece is hollow and abuts the end face of said press member and wherein the retainer clip frictionally engages the inside diameter of the workpiece to hold it on said press member.

7. The press tool of claim 6 wherein said workpiece has a tapered inside diameter and said retainer clip is made of a resilient material and frictionally engages the tapered inside diameter of the workpiece.

8. The press tool of claim 3 wherein said retainer clip is made of a resilient material and said workpiece is hollow with a surface engaged by said retainer clip which surface has an inside diameter less than the outside diameter of said clip in its free state and the base of said groove has a diameter less than the inside diameter of said clip when engaged with said surface of said workpiece.

9. The press tool of claim 3 wherein said relieved surfaces of said retainer clip are substantially flat.

10. A workpiece holding press tool for pressing a workpiece into a bore of a body, comprising an elongate press member having an end face and an annular collar extending from the end face, said press member having a central threaded opening and a counterbore through said collar, a spacer plug having an annular body located within said counterbore and a head portion extending outside of said counterbore, and forming a first groove with said press member, said head portion having an end face, said spacer plug having a counterbored through opening therethrough, a plug member having an annular body located within the counterbore in said spacer plug, a head portion extending outside of the counterbore in said spacer plug and forming a second groove with said spacer plug, and a counterbored opening extending therethrough, and first and second split circular retainer clips having opposed ends with a relieved outer surface thereon and received in said first and second grooves to frictionally hold and retain a workpiece on said press member.

11. The press tool of claim 10 wherein said spacer plug has a stepped-down neck head portion which abuts said collar of said press member to form said first groove, and said plug member has a stepped-down neck on its head portion which abuts the end face of said spacer plug to form said second groove.

12. The press tool of claim 11 which also comprises a threaded fastener extending through the openings in said spacer plug and said plug member and threaded into the threaded opening of said press member to secure said spacer plug and said plug member to said press member.

13. The press tool of claim 10 wherein said workpiece is hollow and abuts the end face of said press member and wherein said retainer clips frictionally engage the inside diameter of the workpiece to hold it thereon.

14. The press tool of claim 13 wherein said workpiece has a straight inside diameter.

15. The press tool of claim 14 wherein both retainer clips frictionally engage the inside diameter of said workpiece.

* * * * *